US011263371B2

(12) United States Patent
Bowen et al.

(10) Patent No.: US 11,263,371 B2
(45) Date of Patent: Mar. 1, 2022

(54) COMPUTER AIDED SYSTEMS AND METHODS FOR CREATING CUSTOM PRODUCTS

(71) Applicant: Best Apps, LLC, Miami Beach, FL (US)

(72) Inventors: Michael Bowen, Los Angeles, CA (US); Payton Breck Arriaga, Los Angeles, CA (US); Linden D. Nelson, Miami Beach, FL (US)

(73) Assignee: Best Apps, LLC, Miami Beach (CA)

( * ) Notice: Subject to any disclaimer, the term of this patent is extended or adjusted under 35 U.S.C. 154(b) by 0 days.

(21) Appl. No.: 17/185,284

(22) Filed: Feb. 25, 2021

(65) Prior Publication Data

US 2021/0279381 A1    Sep. 9, 2021

Related U.S. Application Data

(60) Provisional application No. 62/984,678, filed on Mar. 3, 2020.

(51) Int. Cl.
*G06F 30/20* (2020.01)
*G06F 30/12* (2020.01)
(Continued)

(52) U.S. Cl.
CPC .............. *G06F 30/20* (2020.01); *G06F 30/12* (2020.01); *G06F 2111/02* (2020.01); *G06F 2111/16* (2020.01)

(58) Field of Classification Search
CPC ...... G06F 3/04842; G06F 16/54; G06F 30/15; G06F 30/20; G06F 2111/16; G06F 2111/02; G06F 40/186
See application file for complete search history.

(56) References Cited

U.S. PATENT DOCUMENTS 4,873,643 A    10/1989  Powell et al.
6,389,850 B1    5/2002  Fujiwara
(Continued)

FOREIGN PATENT DOCUMENTS

WO    WO 2009/097276 A1    8/2009
WO    WO 2013/101957 A1    7/2013
(Continued)

OTHER PUBLICATIONS

"All-in-One Designer—Design Studio Features" (retrieved from the Internet at Youtube "All-in-One Designer—Design Studio Features", designnbuyTV https://www.youtube.com/watch?v=wejvOhC6-54 Oct. 10, 2018 (Year: 2018).
(Continued)

*Primary Examiner* — Thai Q Phan
(74) *Attorney, Agent, or Firm* — Knobbe, Martens, Olson & Bear LLP

(57) ABSTRACT

A computer-aided design (CAD) system enables physical articles to be customized via printing or embroidering and enables digital content to be customized and electronically shared. A CAD user interface may be generated that includes an image of a model of an article of manufacture and a customizable template. The customizable template may include user customizable design areas. One or more defined rules associated with respective customizable areas may be accessed. In response to a user selection of a default content item and a corresponding rule, content items may be automatically used to populate other template design areas and/or change a color of one or content items. Manufacturing instructions corresponding to the user customizations may be transmitted to a printing system using a file that includes location, rotation, and/or scale data.

30 Claims, 11 Drawing Sheets

(51) Int. Cl.
G06F 111/16 (2020.01)
G06F 111/02 (2020.01)

(56) References Cited

U.S. PATENT DOCUMENTS

| | | | |
|---|---|---|---|
| 6,459,952 B1 | 10/2002 | Dundorf | |
| 6,684,188 B1* | 1/2004 | Mitchell | G16H 10/20 |
| | | | 705/3 |
| 6,718,895 B1 | 4/2004 | Fortuna | |
| 6,804,568 B1 | 10/2004 | Miyazaki et al. | |
| 7,117,469 B1* | 10/2006 | Dahl | G06F 30/392 |
| | | | 716/122 |
| 8,019,182 B1 | 9/2011 | Wolfram | |
| 8,180,474 B2 | 5/2012 | Basheer | |
| 8,261,195 B2 | 9/2012 | Buehler | |
| 9,177,082 B2* | 11/2015 | Linder | G06T 15/40 |
| 9,418,375 B1 | 8/2016 | Cunico | |
| 9,623,578 B1 | 4/2017 | Aminpour | |
| 9,702,071 B2 | 7/2017 | Harvill et al. | |
| 9,782,906 B1 | 10/2017 | Aminpour | |
| 9,868,302 B1 | 1/2018 | Aminpour | |
| 9,971,854 B1 | 5/2018 | Bowen | |
| D819,673 S | 6/2018 | Bowen | |
| 10,140,392 B1 | 11/2018 | Bowen | |
| 10,254,941 B2 | 4/2019 | Bowen | |
| 10,437,446 B2 | 10/2019 | Bowen | |
| 10,496,763 B2* | 12/2019 | Bowen | G06F 40/186 |
| 10,706,637 B2 | 7/2020 | Bowen | |
| 10,769,317 B2 | 9/2020 | Bowen | |
| 10,802,692 B2 | 10/2020 | Bowen | |
| 10,853,626 B2* | 12/2020 | Malkemus | G06T 11/60 |
| 10,867,081 B2 | 12/2020 | Bowen | |
| 10,922,449 B2 | 2/2021 | Bowen | |
| 11,030,574 B1 | 6/2021 | Grande | |
| 2002/0114537 A1 | 8/2002 | Sutula | |
| 2003/0069809 A1 | 4/2003 | von Rosen et al. | |
| 2003/0144758 A1* | 7/2003 | Duggirala | G05B 19/4097 |
| | | | 700/104 |
| 2004/0030997 A1 | 2/2004 | Farrah | |
| 2005/0096885 A1* | 5/2005 | Rhodes | G06F 30/15 |
| | | | 703/1 |
| 2005/0289018 A1 | 12/2005 | Sullivan | |
| 2006/0072847 A1 | 4/2006 | Chor | |
| 2006/0111976 A1 | 5/2006 | Pompushko | |
| 2006/0165280 A1 | 7/2006 | Miwa | |
| 2007/0033568 A1 | 2/2007 | Barrieau et al. | |
| 2007/0132779 A1 | 6/2007 | Gilbert | |
| 2008/0006192 A1 | 1/2008 | Zeiger et al. | |
| 2008/0172208 A1 | 7/2008 | Lechine | |
| 2008/0308636 A1 | 12/2008 | Lynch | |
| 2009/0077510 A1* | 3/2009 | Youngman | G06F 30/30 |
| | | | 716/106 |
| 2009/0122329 A1 | 5/2009 | Hegemier et al. | |
| 2009/0160856 A1 | 6/2009 | Hoguet | |
| 2009/0254814 A1* | 10/2009 | Lai | G06F 40/186 |
| | | | 715/244 |
| 2010/0162137 A1 | 6/2010 | Ganz et al. | |
| 2010/0169185 A1 | 7/2010 | Cottingham | |
| 2010/0174400 A1 | 7/2010 | Lai | |
| 2010/0274535 A1 | 10/2010 | McDaniel | |
| 2011/0029635 A1* | 2/2011 | Shkurko | G06F 16/54 |
| | | | 709/217 |
| 2011/0060437 A1 | 3/2011 | Durham, III | |
| 2011/0264412 A1 | 10/2011 | Fritz-Humblot | |
| 2012/0105467 A1 | 5/2012 | Chao | |
| 2012/0229491 A1 | 9/2012 | Hymel | |
| 2012/0304052 A1* | 11/2012 | Tanaka | G06T 11/60 |
| | | | 715/243 |
| 2012/0313927 A1 | 12/2012 | Curington | |
| 2013/0061142 A1* | 3/2013 | Brier | G06F 30/00 |
| | | | 715/709 |
| 2013/0061198 A1* | 3/2013 | Brier | G06F 3/0481 |
| | | | 716/139 |
| 2013/0125033 A1 | 5/2013 | Kelley | |
| 2013/0125072 A1 | 5/2013 | Newcomb | |
| 2013/0155111 A1 | 6/2013 | Dirsa | |
| 2013/0173415 A1 | 7/2013 | Harvill et al. | |
| 2013/0208305 A1 | 8/2013 | Epstein | |
| 2013/0243312 A1 | 9/2013 | Sato | |
| 2013/0266229 A1 | 10/2013 | Ptucha | |
| 2014/0033010 A1* | 1/2014 | Richardt | G06F 40/114 |
| | | | 715/222 |
| 2014/0058959 A1 | 2/2014 | Isbjornssund | |
| 2014/0096018 A1 | 4/2014 | Iannucci | |
| 2014/0143082 A1 | 5/2014 | Larson | |
| 2014/0156416 A1* | 6/2014 | Goenka | G06Q 30/0276 |
| | | | 705/14.66 |
| 2014/0215682 A1 | 8/2014 | Northup et al. | |
| 2015/0066189 A1 | 3/2015 | Mulligan | |
| 2016/0035055 A1 | 2/2016 | Perkins | |
| 2016/0072820 A1 | 3/2016 | Shaffer | |
| 2016/0092935 A1 | 3/2016 | Bradley | |
| 2016/0171354 A1 | 6/2016 | Glasgow | |
| 2016/0188783 A1 | 6/2016 | Li | |
| 2016/0210602 A1 | 7/2016 | Siddique | |
| 2017/0039628 A1 | 2/2017 | Wang | |
| 2017/0064334 A1 | 3/2017 | Minoa | |
| 2017/0076346 A1 | 3/2017 | Jennings | |
| 2017/0115847 A1 | 4/2017 | Barras | |
| 2017/0118357 A1 | 4/2017 | Morris | |
| 2017/0139483 A1 | 5/2017 | Selker | |
| 2017/0139886 A1 | 5/2017 | Chalmers | |
| 2017/0220029 A1 | 8/2017 | Allin-Jones | |
| 2017/0258164 A1 | 9/2017 | Barnet | |
| 2017/0259445 A1 | 9/2017 | Aminpour | |
| 2017/0366579 A1 | 12/2017 | Assuncao Aguiar | |
| 2017/0370040 A1 | 12/2017 | Harvill | |
| 2018/0004693 A1 | 1/2018 | Macnamara | |
| 2018/0042419 A1 | 2/2018 | Sanders | |
| 2018/0144243 A1 | 5/2018 | Hsieh | |
| 2018/0173688 A1 | 6/2018 | Melinand | |
| 2018/0285747 A1 | 10/2018 | Bron | |
| 2018/0308054 A1 | 10/2018 | Obrecht | |
| 2019/0004688 A1 | 1/2019 | Bowen | |
| 2019/0012568 A1 | 1/2019 | Ku Mar et al. | |
| 2019/0021426 A1 | 1/2019 | Barnes | |
| 2019/0026394 A1 | 1/2019 | Barnes | |
| 2019/0026395 A1 | 1/2019 | Barnes | |
| 2019/0026396 A1 | 1/2019 | Barnes | |
| 2019/0026406 A1 | 1/2019 | Barnes | |
| 2019/0026407 A1 | 1/2019 | Barnes | |
| 2019/0026809 A1 | 1/2019 | Barnes | |
| 2019/0026810 A1 | 1/2019 | Barnes | |
| 2019/0108292 A1* | 4/2019 | Bowen | G06F 3/04842 |
| 2019/0244407 A1 | 8/2019 | Wiesel | |
| 2019/0258925 A1 | 8/2019 | Li | |
| 2019/0391731 A1* | 12/2019 | Adler | G06F 3/04817 |
| 2020/0090407 A1 | 3/2020 | Miranda | |
| 2020/0126316 A1 | 4/2020 | Sharma | |
| 2020/0147486 A1 | 5/2020 | Bleasdale-Shepherd | |
| 2020/0159870 A1 | 5/2020 | Bowen | |
| 2020/0159871 A1 | 5/2020 | Bowen | |
| 2020/0160612 A1 | 5/2020 | Bowen | |
| 2021/0027353 A1 | 1/2021 | Asbury | |

FOREIGN PATENT DOCUMENTS

| | | |
|---|---|---|
| WO | WO 2019/005562 A1 | 1/2019 |
| WO | WO 2020/106905 A1 | 5/2020 |

OTHER PUBLICATIONS

"Creating a Product Template," Zazzle Help Center, Jun. 2, 2018, 7 pages, https://protect-us.mimecast.com/s/B0fMCPNG43Sv4I4oc0MyUf?domain=help.zazzle.com.

DesignnbuyTV: "Web to Print Software—All-in-one Designer—Demo", YouTube, Nov. 19, 2013, pp. 1-1, url: https://www.youtube.com/watch?v=lcEX2isIP08.

Ed C., "Sneak Peek . . . EZ Template", Zazzle blog, 2 page, https://zazzleblog.wordpress.com/2007/07/31/sneak-peekez-templates/, Jul. 31, 2007.

(56) References Cited

OTHER PUBLICATIONS

Freeformatter ("XSL Transformer—XSL T", 2016, https://www.freeformatter.com/xsl-transformer.html).
Help Center "Creating a Product Template"—Apr. 4, 2019, 4 pages, https://help.zazzle.com/hc/en-us/articles/219145288-Creating-a-Product-Template.
International Search Report and Written Opinion dated Oct. 2, 2018, received in International Patent Application No. PCT/US2018/038594.
Lifewire "What Is a Mobile Device?," Retrieved from Wayback Machine Sep. 27, 2018, storing https://www.lifewire.com/what-is-a-mobile-device-2373355 (Year: 2018).
PCT International Search Report & Written Opinion, regarding International Application No. PCT/US2019/062506, dated Mar. 3, 2020, 24 pages.
Quackit retrieved from the Wayback Machine Internet Archive May 8, 2017 https://www.quackit.com/html_5/tags/html_iframe_tag.cfm (Year: 2017).
Wikipedia article on Mobile Devices Retrieved from Wayback Machine Jul. 26, 2018, storing https://en.wikipedia.org/wiki/Mobile_device (Year: 2018).
International Search Report and Written Opinion dated Jun. 25, 2021, received in International Patent Application No. PCT/US2021/019718, in 19 pages.
Jackson Duanfeng et al., "Automatic Authentication Method and Scanner," IEEE Xplore, pp. 161-164 (Year: 2007).

\* cited by examiner

FIG. 3D

COMPUTER AIDED SYSTEMS AND METHODS FOR CREATING CUSTOM PRODUCTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 1 CFR 1.57.

BACKGROUND

The present invention is generally related to computer aided design and the manufacture of custom products.

DESCRIPTION OF THE RELATED ART

Computer-Aided Design (CAD) systems are conventionally used to design articles of manufacture. However, such conventional CAD systems often have overly difficult to use user interfaces, do not adequately ensure compliance with manufacturing processes, and do not provide adequate mechanisms for a manufacturer to provide flexibility for users to customize articles of manufacture.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to a computer-aided design system that enables physical articles to be customized via printing, embroidering, or otherwise, and enables digital content to be customized and electronically shared. A user interface may be generated that includes an image of a model of an article of manufacture and user customizable design areas. A design customization user interface may be provided enabling a user to access a customizable template comprising one or more design areas (sometimes referred to as slots) for use in object customization. The user may be enabled to select or specify design elements that may be used to customize the object using the customizable template. Rules may be utilized to propagate a user input with respect to one design area to other design areas. Manufacturing instructions corresponding to the user customizations may be transmitted to a printing system using a file that includes location, rotation, and/or scale data.

An aspect of the present disclosure relates to a computer-aided design (CAD) computer system comprising: a computing device; a network interface; a non-transitory data media configured to store instructions that when executed by the computing device, cause the computing device to perform operations comprising: provide a design rule definition user interface comprising: a conditional specification user interface comprising: a first field configured to receive a specification of: a first template slot and associated slot content for a first customizable template; a second field configured to receive a specification of: a second template slot and associated slot content specification for the first customizable template; an operator field configured to receive an operator specification that relates the first slot and associated slot content specification with the second slot and associated slot content specification; a consequent specification user interface comprising: a third field configured to receive a specification of: a third template slot and associated slot content specification for the first customizable template; receive, via the network interface from a user device of a user, a user selection of an image of a product from an interactive catalog; enable a representation of the product to be presented on the user device; receive a user selection of the first customizable template; access one or more rules associated with the first customizable template, the accessed rules defined using the design rule definition user interface; access a data source locator associated with the first customizable template; access data using the data source locator; enable at least a portion of the first customizable template populated using the data accessed using the data source locator to be presented by the user device via a computer aided design user interface; receiving a user customization of a first rendered template slot; determining if the user customization of the first rendered template slot violates a first rule; at least partly in response to determining that the user customization of the first rendered template slot violates the first rule, reversing the user customization of the first template slot; receiving a user customization of a second rendered template slot; using a second rule to modify a third rendered template slot based at least in part on the user customization of the second rendered template slot; causing the first customizable template, as customized by the user, to be printed or embroidered on a physical instance of the product.

An aspect of the present disclosure relates to a computer-implemented method, the method comprising: receiving, over a network at a computer system, a first rule via a design rule definition user interface, the design rule definition user interface comprising: a conditional specification user interface comprising: a first field configured to receive a specification of: a first template slot and associated slot content specification for a first customizable template; a second field configured to receive a specification of: a second template slot and associated slot content specification for the first customizable template; an operator field configured to receive an operator specification that relates the first slot and associated slot content specification with the second slot and associated slot content specification; a consequent specification user interface comprising: a third field configured to receive a specification of: a third template slot and associated slot content specification for the first customizable template; wherein the first rule is associated with the first customizable template, the first rule comprising a first conditional specification and a first consequent specification; receiving, over the network at the computer system from a user device of a user, a user selection of an image of an object; enabling a representation of the object to be presented on the user device; accessing at least the first rule associated with the first customizable template; accessing a data source locator associated with the first customizable template; accessing data using the data source locator; enabling at least a portion of the first customizable template populated using the data accessed using the data source locator to be presented by the user device via a customization user interface; receiving a user input with respect to a first depicted template slot via the customization user interface; using the first rule to modify a second depicted template slot based at least in part on the user input with respect to the first depicted template slot; enabling the first customizable template, as customized by the user, to be printed or embroidered on a physical instance of the object and/or for an electronic file corresponding to the object customized using the first customizable template to be electronically distributed.

An aspect of the present disclosure relates to a computer system comprising: a computing device; a network interface; a non-transitory data media configured to store instructions that when executed by the computing device, cause the computing device to perform operations comprising: receive, using the network interface, a first rule via a design rule definition user interface comprising: a conditional specification user interface comprising: a first field configured to receive a first template slot and associated slot content specification for a first customizable template; a second field configured to receive a second template slot and associated slot content specification for the first customizable template; an operator field configured to receive an operator specification that relates the first slot and associated slot content specification with the second slot and associated slot content specification; a consequent specification user interface comprising: a third field configured to receive a third template slot and associated slot content specification for the first customizable template; wherein the first rule is associated with the first customizable template, the first rule comprising a first conditional specification and a first consequent specification; receive, using the network interface from a user device of a user, a user selection of an image of an object; enable a representation of the object to be presented on the user device; access at least the first rule associated with the first customizable template; access a data source locator associated with the first customizable template; access data using the data source locator; enable at least a portion of the first customizable template to be populated using the data accessed using the data source locator; enable at least a portion of the first customizable template populated using the data accessed using the data source locator to be presented by the user device via a customization user interface; enable the first rule to modify a second depicted template slot based at least in part on a user input with respect to the first depicted template slot; enable the first customizable template, as customized by the user, to be printed or embroidered on a physical instance of the object and/or for an electronic file corresponding to the object customized using the first customizable template to be electronically distributed.

An aspect of the present disclosure relates to a computer implemented method, the method comprising: receiving a first rule via a corresponding user interface, the corresponding user interface comprising: a conditional specification user interface comprising: a first field configured to receive a first template slot and associated slot content specification for a first customizable template; a second field configured to receive a second template slot and associated slot content specification for the first customizable template; an operator field configured to receive an operator specification that relates the first slot and associated slot content specification with the second slot and associated slot content specification; a consequent specification user interface comprising: a third field configured to receive a third template slot and associated slot content specification for the first customizable template; wherein the first rule is associated with the first customizable template, the first rule comprising a first conditional specification and a first consequent specification received via the consequent specification user interface; receiving a user selection of an object; enabling a representation of the object to be presented on the user device; accessing at least the first rule associated with the first customizable template; accessing a data source locator associated with the first customizable template; accessing data using the data source locator; enabling at least a portion of the first customizable template to be populated using the data accessed using the data source locator; enabling at least a portion of the first customizable template populated using the data accessed using the data source locator to be presented by the user device via a customization user interface; enabling the first rule to modify a second depicted template slot based at least in part on a user input with respect to the first depicted template slot; enabling the first customizable template, as customized by the user, to be printed or embroidered on a physical instance of the object and/or for an electronic file corresponding to the object customized using the first customizable template to be electronically distributed.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

FIGS. 3A-3G illustrate example interfaces.

DESCRIPTION

Figure 1A:
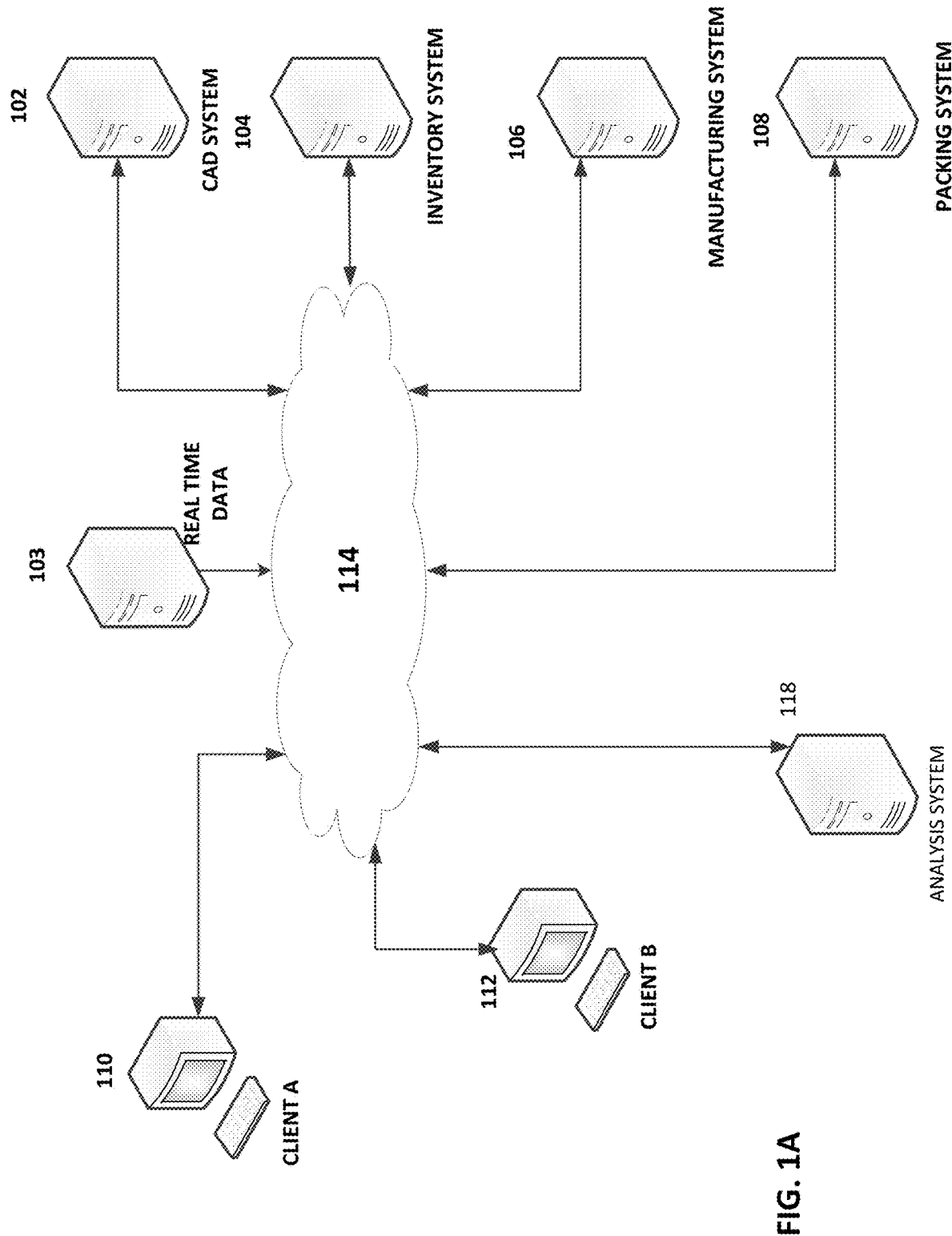
FIG. 1A is a block diagram illustrating an example embodiment of an operating environment.

Systems and methods are described that provide computer aided design of customized items (e.g., physical or digital objects). Non-limiting examples of such items may include t-shirts, hoodies, shirts, jackets, dresses, pants, glasses, phone cases, laptop skins, backpacks, laptop cases, tablet cases, hairbands, wristbands, jewelry, digital content, and the like. Techniques, processes and user interfaces are disclosed that enable more efficient and accurate generation, editing, and printing or embroidering of design elements. Because the resulting customized items will more closely reflect user-desired customizations, there may be less wastage of materials (e.g., item fabric, ink, etc.), as there will be fewer defective or unsatisfactory customized items.

The user may utilize the CAD system to select an object to customize (e.g., t-shirts, hoodies, shirts, jackets, dresses, pants, glasses, phone cases, laptop skins, backpacks, laptop cases, tablet cases, hairbands, wristbands, jewelry, digital content, and the like) from an interactive catalog of objects, and may then customize the object using design elements/templates from a library of design elements/templates (e.g., tournament/match brackets, sport paraphernalia (e.g., sport clothing, sports equipment (e.g., basketball, baseball, football, soccer ball, hockey puck, basketball hoop, basketball net, football goal post, hockey goal, baseball bat, hockey stick, etc.), team names, team logos, league names, league logos, and/or the like), and/or user-provided content (e.g., uploaded images or text).

Where the customized object is a digital object (e.g., a displayable electronic image customized by the user), the user-customized object may be transmitted to and displayed by a display (e.g., a large screen display at a venue during an event) and/or shared via social media or other communication channels (e.g., short messaging service messages, email, or otherwise).

Optionally, the CAD system may enable an item (e.g., a product) provider to submit (e.g., via an upload or by providing a link) one or more images of the item (e.g., a photograph or graphic image of the front, back, left side, right side, top view, bottom view, and/or interior view of the item) and/or portions of the item (e.g., left sleeve, right sleeve, shoe lace, strap, etc.) for posting to an online interactive catalog of one or more items. The CAD system may enable certain customization options to be enabled for users and may enable the definition of certain areas of the item which may or may not be customized by users.

An example CAD system may provide a user interface including a design area and a set of tools via which a product provider can specify and/or apply design elements (e.g., text, image, and/or a graphic design elements) to an object product, specify areas to which an end user may specify design elements to be applied (e.g., printed or embroidered), specify permitted end user modifications to a design element originally specified by the product provider (that the system may perform in response to an end user request), specify permitted design element types and characteristics that the system may apply to the product in response to an end user request.

Optionally, as noted above, the CAD system may provide predefined templates for customizing objects which the user may edit. Optionally, rules may be defined that limit modifications the user may make to the template. Examples of CAD systems, and examples of such rules, and systems and methods for enforcing and implementing such rules are described in U.S. application Ser. No. 16/690,029, filed Nov. 20, 2019, titled COMPUTER AIDED SYSTEMS AND METHODS FOR CREATING CUSTOM PRODUCTS, now U.S. Pat. No. 10,922,449, the contents of which are incorporated herein in their entirety.

Templates, including image templates, text templates, and templates that include both image(s) and text may be presented by the CAD system to an end-user to provide the end-user with a starting point for customization of an object, thereby simplifying the customization process. A given template may include one or more design areas, sometimes referred to herein as slots. The template may optionally include non-removable or non-editable design elements, and/or removable or editable design elements in respective slots. A template, by way of example, may include text, a digital sticker (e.g., a licensed cartoon character image), a logo, an image of a person (e.g., images of the user, an athlete, a team, performers, and/or the like), a graphic (e.g., a tournament/match bracket, graphics/images of sport paraphernalia (e.g., sport clothing, sports equipment (e.g., basketball, baseball, football, soccer ball, hockey puck, basketball hoop, basketball net, football goal post, hockey goal, baseball bat, hockey stick), team names, team logos, league names, league logos, and/or the like), etc. A template may be editable by the end-user in accordance with item provider and/or template provider restrictions.

A template may be associated with rules that may automatically propagate user template edits or selection to other slots and/or design elements of the template and where the template may be associated with rules that may prevent user modifications of the template that would be incompatible with what a design element corresponds to.

For example, if a user enters text or causes text to be entered into a template field (e.g., the name of a sports team), a color of another design element (e.g., a basketball) may be automatically changed to match the sports team's color. By way of further example, if the template includes a tournament/match bracket where the user may select a winning team in one round, a rule may be prevent the user from inserting the losing team at a later round. By way of further example, if a match has already taken place and the template is prepopulated with the match winner at the corresponding bracket branch, the user may be inhibited from changing the match winner.

By way of further example, with respect to entertainment applications, if a user selects from a gallery of images an image of an actor in or host of a show, the name of the show and/or show logos may automatically populate corresponding template slots. By way of yet further example, if a user selects, with respect to a template slot, an image of a movie or show character from a gallery of character images, other slots may be populated with images of other characters from the show or movie.

A user interface may be provided via which an item provider may specify which colors in a given image can or cannot be changed. By way of further example, a user interface may be provided via which an item provider may specify which portions of an image may or may not be edited. By way of still further example, a user interface may be provided via which an item provider may specify design element size change restrictions (e.g., a maximum and/or a minimum height or width), restrict adding one or more specified colors to a design element, restrict changes to design element orientation (e.g., maximum and/or minimum rotation angle), restrict changes to text content (e.g., prevent changes to one or more words in a text design element), restrict changes to a design template height/width ratio, restrict changes to one or more fonts, restrict the use of one or more effects (e.g., text curvature effects, 3D effects, etc.), and/or the like. By way of yet further example, a user interface may be provided via which a user may specify placement/movement restrictions for templates, images and/or text.

By way of further example, a user interface may be provided via which a user may specify that certain text and/or image notifications (e.g., copyright notices, trademark notices) or logos may not be removed and/or altered. By way of additional example, a user interface may be provided via which a user may specify that the certain design elements may not be used together to customize an object. By way of further example, a user interface may be provided via which a user may specify that the certain types of design elements (e.g., images of alcohol, drugs, drug paraphernalia, religious symbols, celebrities, etc.) may not be used to customize an object.

By way of yet further example, a user interface may be provided via which a user may specify propagation rules, wherein if a user selects, enters, or modifies a given design element, other template design elements may automatically be replaced or modified accordingly.

For example, as described elsewhere herein, a template may include a tournament bracket that may be customizable by a user. The tournament bracket may correspond to a multi-stage sports, game show, talent competition, or other tournament, where the top or winning participants (e.g., sports teams or individuals) of one stage progress to the next stage, while the losing participants may be eliminated from further play in the tournament. A tournament may be an elimination tournament (e.g., a single elimination tournament, a double elimination tournament, etc.). By way of illustrative example, the user may, via a corresponding user interface, customize a bracket by selecting winners of each stage of the competition, and where the identifiers associated with the winners (e.g., a team name, nickname, logo, image of a team player, and/or the like) will be respectively displayed on corresponding branches of the bracket.

By way of illustration, the NCAA (National Collegiate Athletic Association) Division I men's basketball tournament is a single-elimination tournament of 68 teams that compete in seven rounds for the national championship. The penultimate round, with only four teams remaining, is commonly referred as the Final Four. The stage at which there are only eight teams remaining is often referred to as the Elite 8, and the stage at which there are only sixteen teams remaining is often referred to as the Sweet 16.

The teams that participate in the tournament include automatic qualifiers (where the 32 Division I conferences all receive an automatic bid, which they each award to the team that wins the corresponding postseason conference tournament) and at-large bids (where a selection committee selects 36 teams that are not automatic qualifiers to be invited to participate in the tournament). The 68 teams are divided into four regions and organized into a single-elimination "bracket", which pre-determines, when a team wins a game, which team it will face next. Each team is "seeded", or ranked, within its region from 1 to 16. Teams, seeded by rank, proceed through a single-game elimination bracket beginning with a "first four" consisting of 8 low-seeded teams playing in 4 games for a position in the first round before the first round begins, a first round consisting of 64 teams playing in 32 games, then the second round of 32 teams in 16 games, followed by 16 teams in 8 games (the "Sweet 16"), following by 8 teams in 4 games (the "Elite 8"), the "Final Four" round, with one from each region (East, South, Midwest, and West), and then the national championship game with the two winners of the Final Four.

The tournament and its progression may be represented by a graphic, known as a bracket which may be in the form of a tree diagram that represents the series of games. In the NCAA basketball tournament, the bracket is a horizontal tree-like grid of all the teams in the tournament and the path the teams have to follow to be in the Sweet 16, Elite 8, and Final Four, and in the final game (the championship game). The outermost bracket is optionally filled using the seeding of the 64 teams. Fans enjoy filling out the remainder of the bracket using their predictions as to which team will win each game at each stage. However, given the complex number of possible permutations, no one has successfully filled out a perfect bracket.

Certain aspects of the disclosure will now be discussed with reference to the figures.

An example system architecture that may be utilized to provide computer aided design and manufacturing services will now be discussed with reference to FIG. 1A. The various systems and devices may communicate with each other over one or wired and/or wireless networks 114. In the illustrated embodiment, a computer aided design (CAD) system 102 may be hosted on one or more servers. The CAD system 102 may be cloud-based and may be accessed by one or more clients 110, 112 (e.g., associated with an item provider or end user) over a network 114 (e.g., the Internet, Ethernet, or other wide area or local area network). Client terminals 110, 112 may be able to share software applications, computing resources, and data storage provided by the CAD system 102.

The client terminals may be in the form of a desktop computer, laptop computer, tablet computer, mobile phone, smart television, dedicated CAD terminal, or other computing device. A client terminal may include user input and output devices, such a displays (touch or non-touch displays), speakers, microphones, trackpads, mice, pen input, printers, haptic feedback devices, cameras, and the like. A client terminal may include wireless and/or wired network interfaces via which the client terminal may communicate with the CAD system 102 over one or more networks. A client terminal may optionally include a local data store that may store CAD designs which may also be stored on, and synchronized with, a cloud data store.

User interfaces described herein are optionally configured to present user edits or customizations (e.g., edits to images, text, item colors, or the like) in real time as applied to an item image to thereby ensure enhanced accuracy, reduce the possibility of user error, and so make the customization process more efficient. The user interfaces may present controls and renderings to further ease the specification of customization permissions by item providers, and to ease customizations of items by end users.

Optionally, a version of the user interfaces described herein may be enhanced for use with a small screen (e.g., 4 to 8 inches diagonal), such as that of a mobile phone or small tablet computer. For example, the orientation of the controls may be relatively more vertical rather than horizontal to reflect the height/width ratio of typical mobile device display. Further, the user interfaces may utilize contextual controls that are displayed in response to an inferred user desire, rather than displaying a large number of tiny controls at the same time (which would make them hard to select or manipulate using a finger). For example, if a user touches an image template in a template gallery, it may be inferred that the user wants to add the image template to a previously selected item design area and to then edit the image template, and so the selected image template may be automatically rendered in real time on the selected item design area on a model/image of a product in association with permitted edit tools.

Further, optionally user interfaces described herein may enable a user to expand or shrink a design element using a multi-touch zoom gesture (where the user touches the screen with two fingers and moves the fingers apart) or a multi-touch pinch gesture (where the user touches the screen with two fingers and moves the fingers together) to further ease editing of a design element and ease specification of a design area or editing restrictions. Optionally, a user interface may enable a user to resize a design element using a one finger icon drag/pull.

Optionally, a resizing control may be provided which enables the user to quickly resize a design element to an appropriate size. For example, if an existing design element is sized for a shirt pocket, the resizing control may enable the user to instruct the system to automatically resize the design element for another selected area, such as a chest area or a sleeve area.

Optionally, user interfaces may be configured to respond to a user swipe gesture (e.g., a left or a right swipe gesture using one or more fingers) by replacing a currently displayed design element (e.g., a template) on an item model with another design element (e.g., another template in a set of templates), sometimes referred to herein as performing a swapping operation. Optionally, if a user has edited a first design element and then used a swipe gesture to replace the design element with a second design element, some or all of the edits made to the first design element (e.g., height edit, width edit, color edit, or the like) may be automatically applied to the second design element.

Optionally, in response to a swipe gesture (e.g., an up or down swipe gesture) a user interface may display metadata related to the displayed item and/or item customizations (e.g., cost, shipping time, item size, etc.) or other notifications.

Optionally, in response to a gesture (e.g., an up/down or left/right swipe) the product on which the design element is displayed is changed. For example, if a design element is displayed on a model of a jacket, the gesture may cause the same design element (optionally with any user edits) to be displayed in real time on another item model (e.g., a t-shirt or a different jacket style) in place of the original jacket model.

The CAD system 102 may provide tools to graphically construct computer models of and to modify computer models of products such t-shirts, hoodies, shirts, jackets, dresses, pants, glasses, phone cases, laptop skins, backpacks, laptop cases, tablet cases, hairbands, wristbands, jewelry, and the like.

The CAD system 102 tools may include tools for specifying and/or applying design elements (e.g., text, image, and/or a graphic design elements) to a product, specify areas to which an end user may apply design elements, specify permitted end user modifications to a design element and/or specify permitted design element types and characteristics that the system may apply to the product in response to an end user request. Optionally, collaboration tools are provided that enable users (e.g., end users, or a graphic designer and an item provider) to collaborate with each other and/or the item provider on customizations for a given product.

The CAD system 102 may optionally generate, based on an end-user design or design modification, corresponding order forms and/or manufacturing instructions. Some or all of the information generated by the CAD system 102 may be provided to an inventory/ordering system 104, a manufacturing system 106, a packing/shipping system 108, and/or an analysis engine 118. Some are all of the foregoing systems may optionally be cloud based. Optionally, the CAD system 102, inventory/ordering system 104, manufacturing system 106, packing/shipping system 108, and/or analysis engine 118 may be the same system and may be operated by the same entity, or may be separate systems operated by separate entities.

Optionally some or all of the services provided by the CAD system 102, inventory/ordering system 104, manufacturing system 106, packing/shipping system 108, and/or analysis engine 118 may be accessed via one or more APIs by authorized third party systems. For example, a sports league or federation may provide access to the services (including some or all the user interfaces) to enable visitors of their website to use logos, team names, brackets, and images of players to customize physical and/or digital items. By way of further example, a third party CAD system used to customize physical and/or digital items may access the services to access restrictions and/or permissions (rules) specified for design elements that users of the third party CAD system are modifying or otherwise using. For example, the third party CAD system may generate a request for usage rules, where the request may identify the design element that a user wishes to use (e.g., customize, combine with other content, electronically distribute, print, etc.). The CAD system may generate a corresponding response to the query that includes usage rules. The third party CAD system may utilize the services to determine if a given modification or other use satisfies the rules.

The CAD system 102 may also enable conditional rules to be defined (e.g., if-then rules) that enable a user input/customization with respect to one design element in a slot to cause another slot to be customized in accordance with the conditional rules.

The CAD system 102 may optionally generate directives in the form of manufacturing machine instructions for applying (e.g., printing or embroidering). For example, design files may be provided that include an image file (e.g., in raster graphics file format, such as a portable network graphics file) and screenshots of the user customized item. Optionally the image file may support RGB color spaces and/or non-RGB color spaces (e.g., CMYK color spaces). Optionally, the image file may be in SVG, PDF, GIF, Encapsulated PostScript, AutoCAD DFX, or ADOBE ILLUSTRATOR format. Optionally, one or more files may be compressed (e.g., losslessly compressed) and transmitted to the manufacturing system 106 in the form of a zip file, jar file or other file format. The manufacturing system 106 may then decompress the file using an appropriate decompression module.

The inventory/ordering system 104 may receive and process an order for a customized item, generate prices for a customized item (e.g., based on a base item price, the number of customizations, and/or the type of customizations), maintain a user shopping cart, and generally interact with a user ordering an item and managing the ordering process. The inventory/ordering system 104, when receiving an order for a customized item customized using the CAD system 102, may determine if the item being designed/modified is in stock, and order items that are below a specified threshold (e.g., zero or some number greater than zero).

The packing/shipping system 108 may generate packing instructions to efficiently package the items being shipped to the user. For example, the instructions may specify package sizes and which items are to be shipped in which package. The packing/shipping system 108 may further generate shipping labels and/or other shipping documents.

One or more data source systems 103 may provide real time and/or non-real time data which may be accessed by the CAD system 102 via an API or otherwise. Such data may be utilized in populating and customizing templates as described elsewhere herein. For example, the data may include sports scores, player and team statistics, award show announcements, weather information, news data, and/or other data.

An analysis system 118 may be configured to analyze user modifications to design elements and/or user added or selected content (e.g., images and/or text) associated by the user with the design elements. The analysis system 118 may be configured to receive a query generated by the CAD system 102 that specifies one or more different feature types to be detected. The CAD system 102 may generate the query based at least in part on rules specified by a source of the design elements. The rules may indicate how a design element may be modified and what content may be used in conjunction with the design element (e.g., overlaying the design element, or directly to one side of the design element). The analysis system 118 may generate a likelihood indication/value as to whether a given feature type is present. The likelihood indication/value may be provided to the CAD system 102, which may determine, using such indication, whether or not the modification and/or associated user added or selected content may be used and/or shared by the user.

The analysis system 118 may utilize artificial intelligence and/or machine learning in performing text, image (e.g., using computer vision), and/or audio analysis to determine the likelihood that given a feature type is present (e.g., the presence of a face by performing face detection) and/or to perform face recognition. For example, the analysis system 118 may utilize a deep neural network (e.g., a convolutional deep neural network) and/or a matching engine in performing facial, image, text, and/or audio analysis.

Figure 1B:
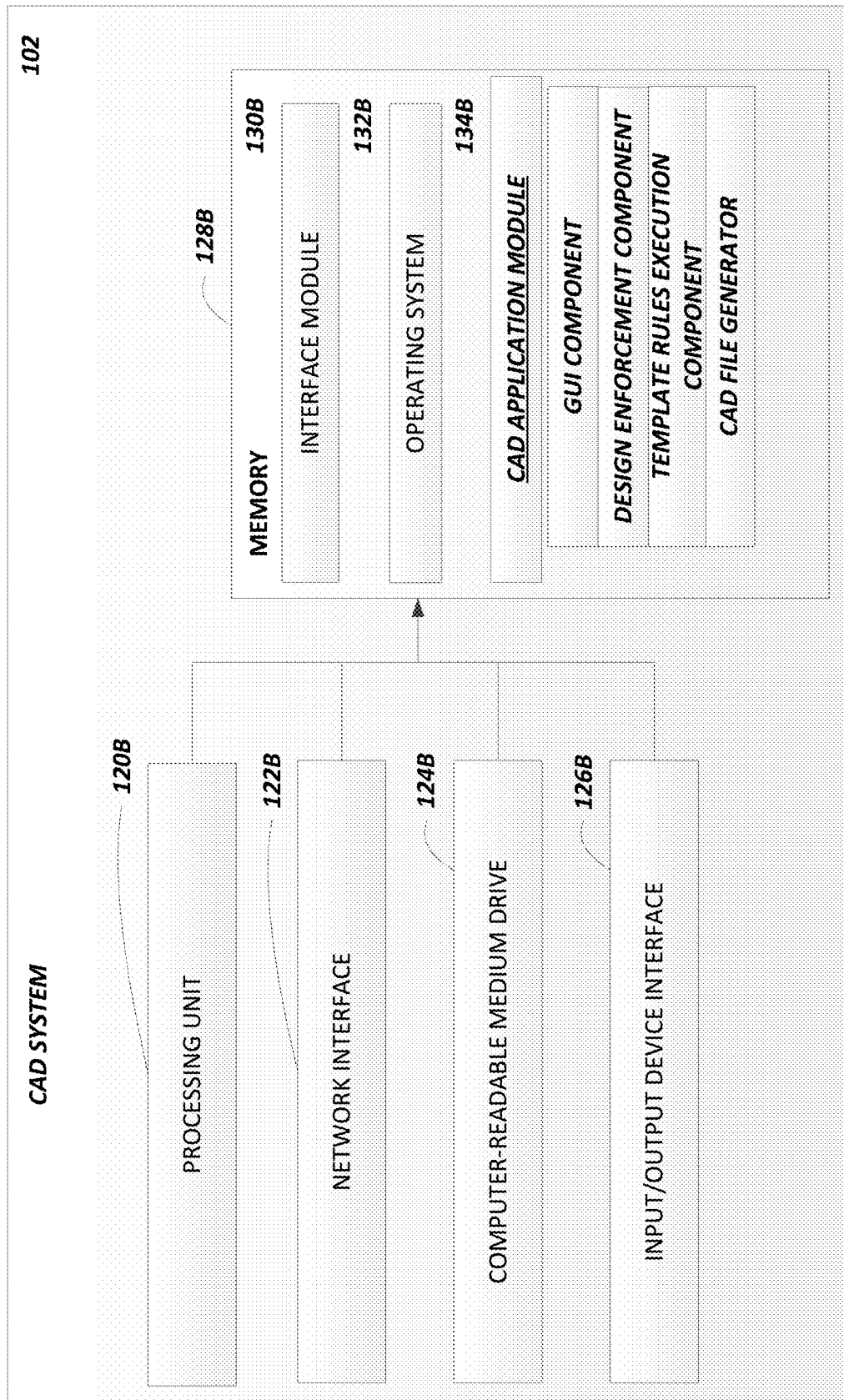
FIG. 1B is a block diagram illustrating an embodiment of example components of a computer aided design (CAD) computing system capable of providing product customization services.

FIG. 1B is a block diagram illustrating an embodiment of example components of the CAD system 102. The example CAD system 102 includes an arrangement of computer hardware and software components that may be used to implement aspects of the present disclosure. Those skilled in the art will appreciate that the example components may include more (or fewer) components than those depicted in FIG. 1B.

The CAD system 102 may include one or more processing units 120B (e.g., a general purpose process and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses. The network interface 122B may provide the CAD services with connectivity to one or more networks or computing systems. The processing unit 120B may thus receive information and instructions from other computing devices, systems, or services via a network. The processing unit 120B may also communicate to and from memory 12B4 and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 120B may execute in order to implement one or more aspects of the present disclosure. The memory 120B generally includes RAM, ROM (and variants thereof, such as EEPROM) and/or other persistent or non-transitory computer-readable storage media. The memory 120B may store an operating system 132B that provides computer program instructions for use by the processing unit 120B in the general administration and operation of the CAD application module 134B, including it components. The memory 128B may store user accounts, including copies of a user's intellectual property assets (e.g., logos, brand names, photographs, graphics, animations, videos, sound files, stickers, tag lines, etc.) and groupings thereof (with associated group names). Optionally, in addition or instead, the intellectual property assets are stored remotely on a cloud based or other networked data store.

The copies of the intellectual property assets and captured images may optionally be stored in a relational database, an SQL database, a NOSQL database, or other database type. Because the assets may include BLOBs (binary large objects), such as videos and large images, which are difficult for conventional database to handle, some (e.g., BLOBs) or all of the assets may be stored in files and corresponding references may be stored in the database. The CAD application module components may include a GUI component that generates graphical user interfaces and processes user inputs, and a design enforcement component to ensure that user designs do not violate respective permissions/restrictions.

A template rules execution component is utilized to execute rules associated with a template. For example, a rule may specify how to propagate user template edits to one design elements to other design elements of the template. By way of further example, a template rule may specify that if a user makes a first type of edit to a first template design element, the user may be prevented from making certain edits to other template design elements (e.g., edits that would be logically incompatible with the edit to the first design element). A rule may be defined using if-then statements comprising Boolean condition (including a variable and an operator, such as equal, not-equal, greater then, less then, etc.)) and a consequent.

A CAD file generator may be configured to generate data files for an inputted user design, and/or an image generator that generates image data files for printing and/or sewing/embroidering machines.

The printing machines may utilize, by way of example, 3D additive printing, heat transfer vinyl, screen printing, direct to garment printing, sublimation printing, and/or transfer printing to print design elements on an item. By way of further example, embroidery machines may be used to embroider design elements on an item. The memory 128B may further include other information for implementing aspects of the present disclosure.

The memory 128B may include an interface module 130B. The interface module 130B can be configured to facilitate generating one or more interfaces through which a compatible computing device, may send to, or receive from, the CAD application module 134B data and designs.

The modules or components described above may also include additional modules or may be implemented by computing devices that may not be depicted in FIGS. 1A and 1B. For example, although the interface module 130B and the CAD application module 134B are identified in FIG. 1B as single modules, the modules may be implemented by two or more modules and in a distributed manner. By way of further example, the processing unit 120B may include a general purpose processor and a graphics processing unit (GPU). The CAD system 104 may offload compute-intensive portions of the applications to the GPU, while other code may run on the general purpose processor. The GPU may include hundreds or thousands of core processors configured to process tasks in parallel. The GPU may include high speed memory dedicated for graphics processing tasks. As another example, the CAD system 102 and their components can be implemented by network servers, application servers, cloud-base systems, database servers, combinations of the same, or the like, configured to facilitate data transmission to and from data stores, client terminals, and third party systems via one or more networks. Accordingly, the depictions of the modules are illustrative in nature.

Figure 2A:
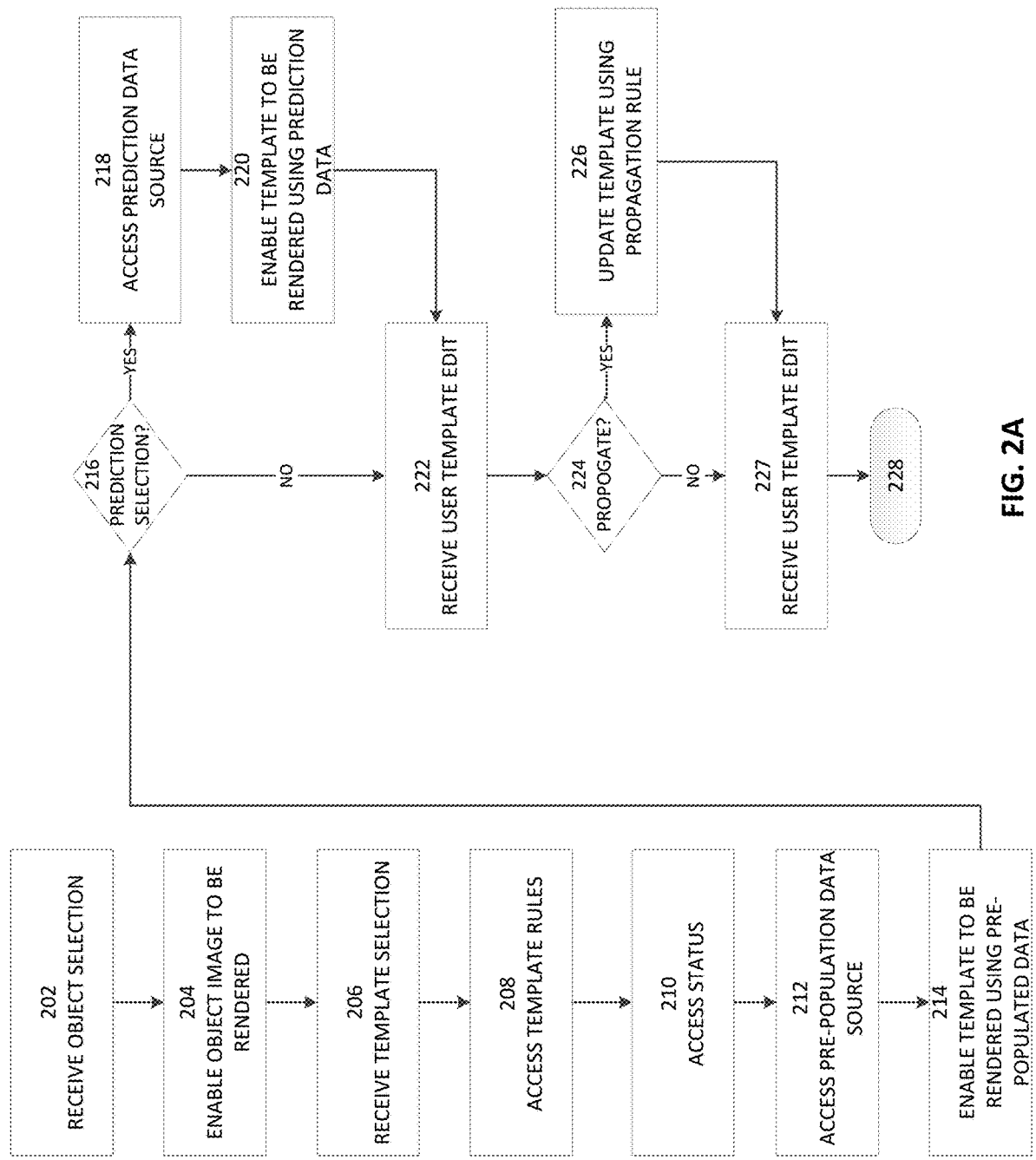
FIGS. 2A-2B illustrate an example process.
Figure 2B:
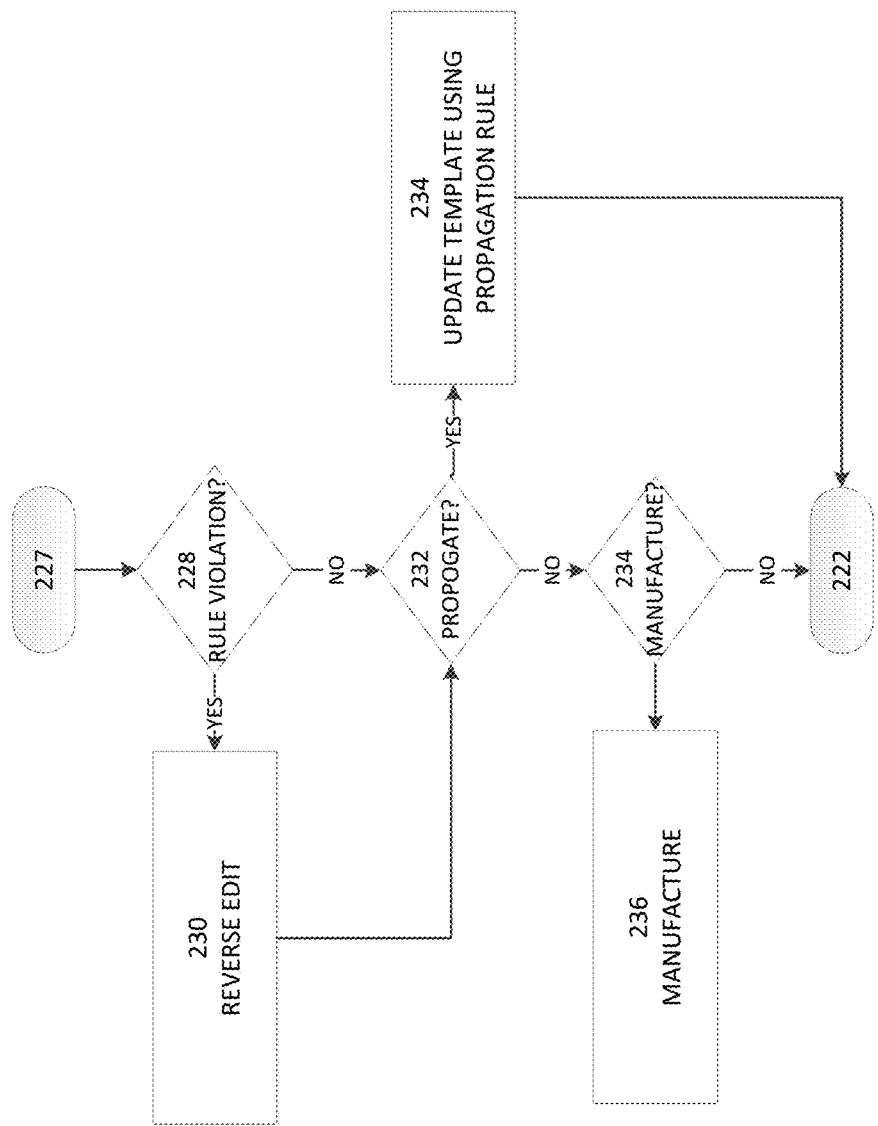

FIGS. 2A-2B illustrate example operations that may be performed with respect to an end user in customizing an item using a template associated with template rules. In this example, the template relates to a tournament, such as the NCAA Division I men's basketball tournament, but the process may similarly be used with respect to other types of templates and template rules.

At block 202, an interactive item selection interface may be enabled to be rendered on a user device (e.g., via a browser or dedicated application). The interactive item selection interface may display or provide access to a catalog of items and a user item selection is received via the interactive item selection interface. At block 204, a computer aided design (CAD) user interface is enabled to be rendered on the user device. For example, the CAD user interface may display an image of the item selected by a user and a menu of available templates.

By way of illustration, the menu of available templates may include templates that include tournament brackets (e.g., brackets for professional, college, or high school basketball tournaments, football tournaments, hockey tournaments, baseball tournaments, tennis tournaments, and/or the like), and associated design elements. For example, the design elements associated with a bracket may include one or more tournament logos, one or more versions of basketballs for a basketball tournament bracket, one or more versions of basketball hoops for a basketball tournament bracket, one or more versions of hockey pucks for a hockey tournament bracket, one or more versions of basketball nets for a basketball tournament bracket, one or more versions of baseballs for a baseball tournament bracket, one or more versions of baseball bats for a baseball tournament bracket, one or more versions of footballs for a football tournament bracket, one or more versions of football goal posts for a football tournament bracket, one or more versions of soccer balls for a soccer tournament bracket, one or more versions of hockey goals for a hockey tournament bracket, one or more versions of hockey sticks for a hockey tournament bracket, and/or the like.

At block 206, a user template selection may be received. In this example, it will be assumed that the user has selected a template comprising a tournament bracket and/or or more related design elements (e.g., a basketball tournament bracket, a tournament logo, a basketball, and a basketball net, and/or a gallery of content that the user may select from (which may include design elements, such as text, team logos, tournament brackets (e.g., for one or more tournaments, band logos, etc.).

At block 208, rules associated with the template may be accessed from memory. For example, the rules may specify propagation rules, wherein if a user selects, enters, or modifies a given design element, other template design elements may automatically be added, replaced, or modified accordingly. By way of further example, the rules may include a rule that prohibits user modifications of the template that would be incompatible with what a design element corresponds to. For example, if the template includes a tournament/match bracket where the user may select, from a match between a first team and a second team, the first team as a winner in one round, a rule may be prevent the user from inserting the losing second team as a participant at a later round. By way of further example, if a match has already taken place and the template is prepopulated with the match winner at the corresponding bracket branch, the user may be inhibited from changing the match winner.

The template/tournament bracket may be associated with a locator (e.g., a URL or file path) for accessing the current tournament status. For example, the tournament status may be accessed, at block 210, from a tournament organizer website, a news website, a local data store, or otherwise (e.g., using an API, where the status may be accessed in JSON, XML, and/or CSV formats). By way of illustration, the status may be "not yet seeded," "seeded but no games played," first round played, second round played, etc.

Optionally, if the status is "not yet seeded," a corresponding notification may be provided to the user and optionally, the user may be inhibited from using and/or customizing the template for use in customizing a product.

At block 212, the bracket may be prepopulated in part or in whole with default data accessed from a source, optionally, based at least in part on the tournament status. For example, if the status is "seeded but no games played," the bracket seeding may be accessed from tournament organizer website (e.g., the NCAA website for a college tournament).

By way of further example, if the status is "seeded but no games played," the outmost branches of the bracket may be prepopulated using the bracket seeds (e.g., accessed from the tournament organizer, news, or other website) the NCAA website for a college tournament), and the remainder of the bracket branches may be left blank (e.g., for the user to customize using user predictions).

At block 214, the pre-populated template (e.g., bracket and related design elements) may be rendered on the user device. For example, if the template includes a tournament bracket, the bracket may be pre-populated with the names and/or logos associated with the teams participating in the tournament.

At block 216, with respect to tournament rounds that have not yet occurred, a user interface may be presented via which the user may optionally select a source (e.g., a news source, a blog, etc.) for populating predictions from the source to populate some or all of the tournament bracket, where the user may then edit the populated values. If the user indicates that the user wants to populate the template using prediction data for a selected source, at block 218, the selected predication source is accessed (e.g., over a network). At block 220, the template may be rendered in a user interface on the user device using the actual tournament data (e.g., for tournament rounds that have taken place) and predicted tournament data.

At block 222, user template edits (which may be in the form of user selections) may be received from the user device via the user interface. For example, the user may select a winner of a match (e.g., by touching or clicking on an identifier associated with a match participant) in order to populate the next bracket round. At block 224, a determination may be made as to whether there is a propagation rule associated with the user edits. If there is a propagation rule, at block 226, the template may be updated in accordance with the propagation rule. For example, if the user selects a winning team for a match, a color of another design element (e.g., the corresponding bracket branch) may be automatically changed to match the sports team's color.

At block 227, a further user template edit may be received. For example, the edit may be a user specification of a tournament match round to a later round than the round associated with the previous user edit. At block 228, a determination may be made as to whether the user edits violates a rule. For example, if the template includes a tournament/match bracket where the user may select, a first team as a winner in one round, a rule may be prevent the user from inserting the losing second team as a participant at a later round. Thus, at block 228, if the process detects that the user has selected a team, that was eliminated from the tournament (e.g., as a result of losing a match), as a winner at a later round, a determination may be made that a rule violation occurred. By way of further example, if a determination is made that the user has changed a winner of a match that has already occurred, a determination may be made that a rule violation occurred. Optionally, edit tools may instead be disabled where any edit would violate a rule.

If a rule violation occurred, at block 230, the user edit may be automatically reversed and a notification of the rule violation may be presented to the user.

If the user activates an order/manufacturing control, at block 236 (and optionally in response to a determination that the customizations comply with design rules), the item may be accordingly customized and provided to the user.

For example, one or more files including the object data and/or the customization data may be transmitted over a network to printing machine for printing. The customized template design elements may be printed or embroidered on the item. For example, the printer may use heat transfer vinyl, screen printing, direct to garment printing, sublimation printing, and/or transfer printing. By way of further example, the printer may be a 3D printer that prints the customized item.

Figure 3A:
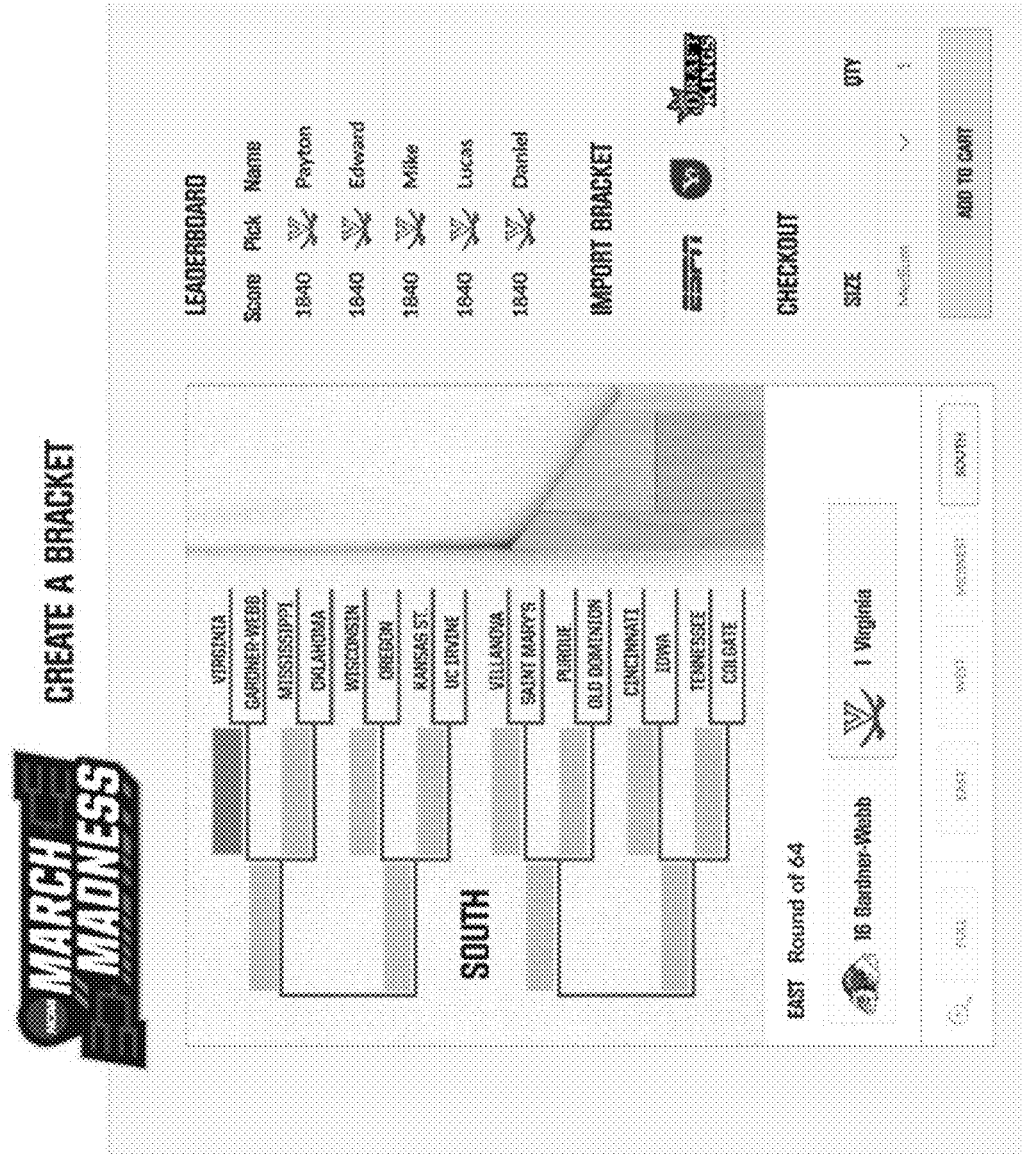

FIG. 3A illustrates an example portion of a template for a sports tournament. The example template includes a bracket and a tournament logo. In this example, only a portion of the bracket is displayed (for a southern conference). Conference controls (East, West, Midwest, South) are provided that, when activated causes the user interface to display a zoomed portion of the bracket corresponding to the selected conference. A full control is provided that when activated cause the user interface to zoom out to show the entire bracket. Thus, the foregoing user interface enable a use to efficiently navigate and edit even a complex, detailed template on a relatively small display device (e.g., a phone with a touch display in the range of 4-7 inches in the diagonal).

Descriptive text is automatically updated to indicate the conference corresponding to the displayed portion of the bracket, and the accessed tournament status (e.g., round of 64, round of 32, Sweet 16, Elite 8, Final 4, Championship). The user interface may automatically select a match or the user may select a match via the bracket (e.g., by touching a corresponding bracket branch). Identifiers (e.g., team name and/or logo) corresponding to the teams participating in the selected match may be automatically be presented in a match field, optionally in association with the seeding/ranking of each team. An import menu interface may be provided via which the user can import bracket match predictions, which may be used to populate the bracket.

The system may analyze the accuracy of predictions of different users with respect to predicted match winners. The system analysis may be used to generate a leaderboard with identifiers of the top predictors (e.g., the top 5, top 10, or top 20 predictors) in association with the prediction accuracy scores, and winner predictions.

A size control may be provided via which the user can select a size (e.g., small, medium, large, extra-large, extra-extra-large, etc.) of the object (e.g., hoody, t-shirt, bag, etc.) being customized. A quantity control may be provided via which the user can specify a quantity of the object being ordered. An add to cart control may be provided which, when activated, causes the object to be added to an electronic shopping cart, with an association to the selected object size, quantity, selected template, and user template customization. A checkout control may be provided, which when activated, enables a purchase process to be initiated via which the user can purchase the customized object. Once the order is completed, the object may then be customized using the user template customization as described elsewhere herein.

Figure 3B:
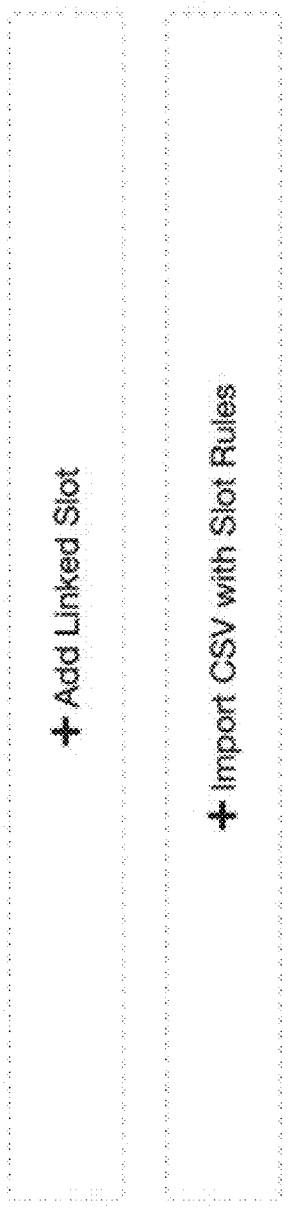

FIG. 3B illustrates an interface that includes a link to an "add linked slot" control and an "import CSV with slot rules" control. User activation of the "add linked slot" control may cause the user interface illustrated in FIG. 3C to be presented, which, as will be described, enables the user to define rules (e.g., conditional statements, such as if-then rules) associated with one or more slots of a template. User activation of the "import CSV with slot rules" control may cause the user interface illustrated in FIG. 3E to be presented, which, as will be described, enables the user to import slot rules in the form of a CSV (comma separated values) file (e.g., generated using a spreadsheet or other application).

Figure 3C:
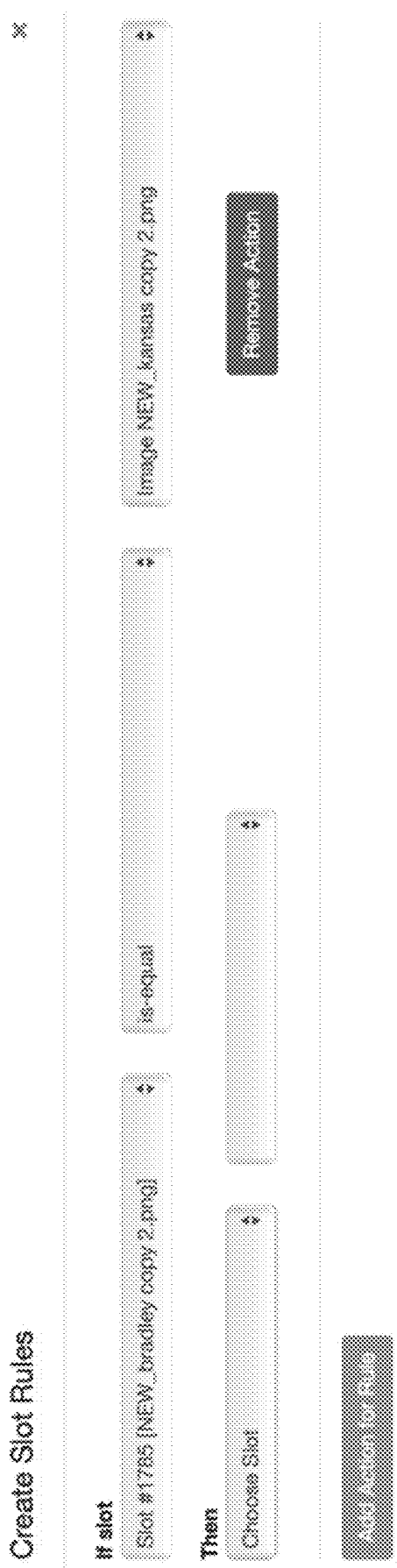

FIG. 3C illustrates an example rule definition user interface. For example, the rule definition user interface may enable a conditional statement, such as an if-then statement comprising an "if" portion (e.g., Boolean condition (including a variable and an operator, such as equal, not-equal, greater then, less then, etc.)) and a "then" portion (a consequent). Interfaces may be provided via which the user can specify rule triggers (e.g., "If" statement). For example, a slot control is provided which when the user can specify from a menu of slots for which tournament bracket slot/match the rule is to be associated with. An operator control may be provided via which the user can specify a rule operator (e.g., equal, not equal, etc.) from a menu of operators. An asset interface is provided via which the user can specify an asset (e.g., a team name) from a menu of assets.

Interfaces may be provided via which the user can specify what action (e.g., a "then" consequent statement) is to be taken in response to the "if" conditional statement being satisfied. For example, a slot control is provided which when the user can specify from a menu of slots for which tournament bracket slot/match the rule action is to be associated with. An operator control may be provided via which the user can specify a rule action operator (e.g., equal, not equal, greater than, or less than, etc.) from a menu of operators. For example, a rule may specify an "if" statement where if a given slot/bracket branch has a specified image, graphic or text, then another slot will be populated with a specified image or text, or a color of an image, graphic, or text may be changed to a specified, different color.

Optionally, a rule may be based on real time, real event data, such as a current score, an inning result at a baseball game, a halftime result at a football game, an announcement of a most valuable player designation, and or the like. The real time data may be accessed via an API over a network from one or more remote sources (e.g., a news feed, a sports feed, etc.) using one or more formats (e.g., JSON, XML, and/or CSV formats). Thus, a template may change in real time based on user modifications and/or real time external event data.

Optionally, a rule may include a chain of conditional and consequent statements (e.g., "if" and "then" statements). For example, a rule may specify:

If slot "A" has an asset=asset #1; and
If slot "B" has an asset≠asset #2; and
If value in Slot "F">20;
Then:
Slot "C"=asset #5; and
Color of asset in Slot "D"=blue.

For example, the value in slot "F" may correspond to a score from a tournament match.

Optionally, a rule may include an event type (e.g., a particular play) detected during a match (e.g., via a sports news feed). For example, a rule may specify for a baseball game:

If slot "A" has an asset=asset #1; and
If "triple play";
Then:
Slot "B"=asset #2; and
Color of asset in Slot "C"=gold.

Optionally, where the template relates to an award ceremony or a like, a rule may include an event type (e.g., a grant of an award to a performer, such as a singer, musical group, actor, etc.) detected during the ceremony. For example, a rule may specify for a musical award ceremony:

If slot "A" has an asset=asset #1; and
If best_new_artist award announced

Then:

Slot "B"=name_of_best_new_artist.

Example rules and templates need not be associated with a competition or tournament. Rules may involve such events as album releases, comments or a web blog, weather conditions (e.g., temperature), ski conditions (e.g., the number of inches of snow on the ground in a selected ski area), news event, etc.

A "remove action" control may be provided which when activated deletes the most recently added "then" statement for the corresponding rule, where the system may store time tags and/or sequence indicators indicating the sequence in which "then" actions were added. For example, if the user activates the remove action control once, the system may access the sequence indicators, identify the most recently added "then" action, and then delete the most recently added "then" action from the user interface and/or memory. If the user activates the remove action control twice, the two most recently added "then" actions may be removed, and so on. Optionally, the user may be prompted to confirm or cancel a remove instruction. Optionally, a remove all control may be provided, which if activated, may delete all the "then" actions for the rule.

An "add action for rule" control may be provided which when activated causes an additional action field (via which the user can cause a specified action to be performed with respect to an associated template slot).

Figure 3D:
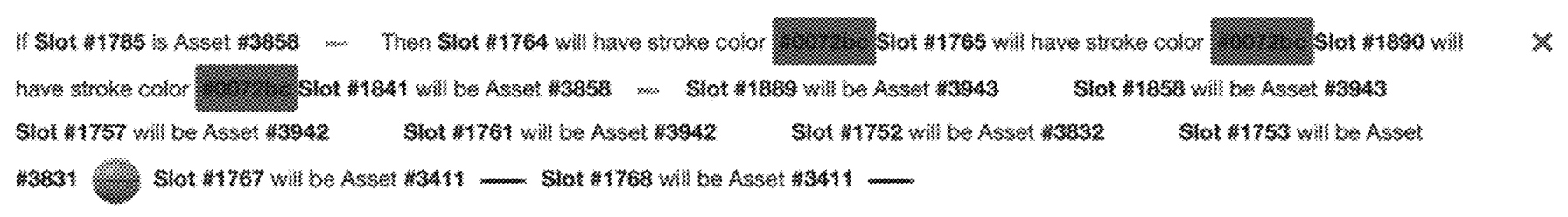

A control which may be provided which when activated causes rules defined using the user interface illustrated in FIG. 3C (or imported as a CSV file) to be visually and logically displayed (such as illustrated in FIG. 3D) to enhance the ability to understand and detect errors in the rule. Such a representation can be especially helpful with complex rules that include multiple "if" statements and multiple "then" actions. The user interface illustrating the rules may include text references to a visual asset (e.g., a graphic image, a photograph, etc.) and/or thumbnails of the visual assets to further enhance the ability to visualize the rules and detect errors.

Figure 3E:
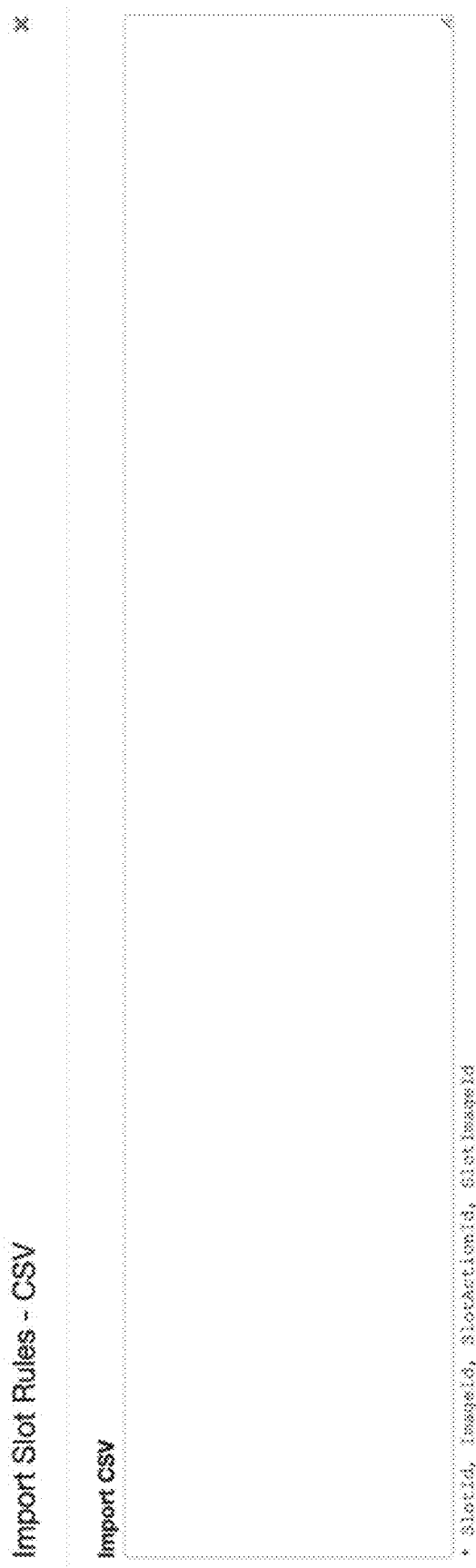

FIG. 3E illustrates an example CSV import field. The user may enter or navigate to an address (e.g., a URL or file path) to the desired CSV file. The contents of the accessed CSV file may then be displayed. By way of example, the CSV may include, for a given rule, a template slot identifier, a content item identifier, a slot action identifier and a slot image identifier, (e.g., a slotID, imageID, slotActionID, slotImageID).

Figure 3F:
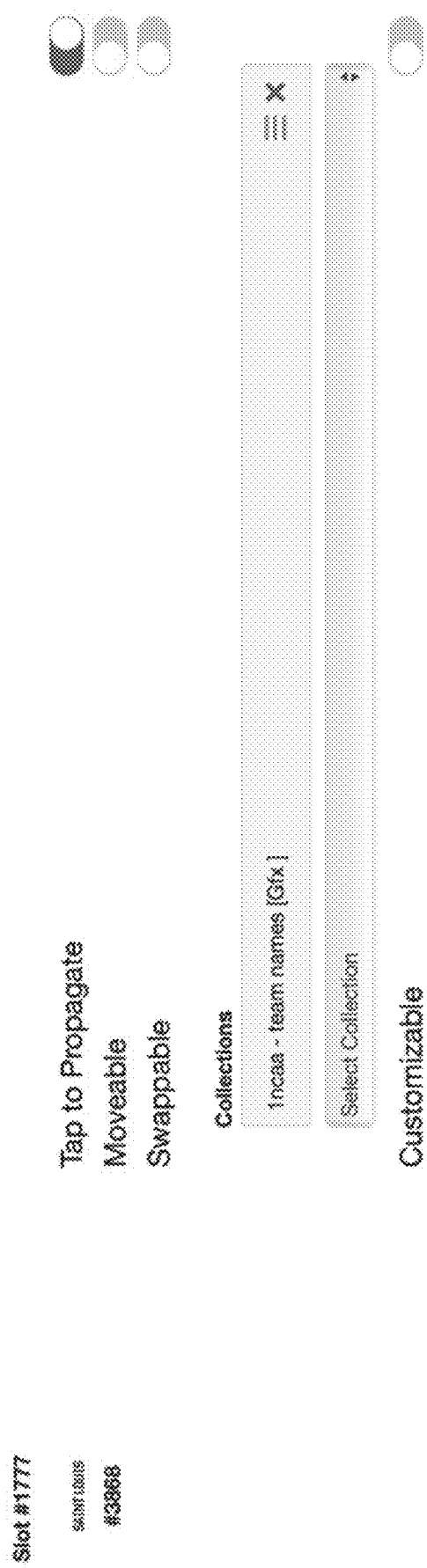

FIG. 3F illustrates an example configuration user interface. The example user interface includes a "tap to propagate" control that enables or disables a user's ability to initiate activation of a propagation rule by touch a slot or slot entry (e.g., tapping a team name on a tournament bracket). A "moveable" control enables or disables a user's ability to move a content item from one slot to another slot, and/or the ability to move the content item to any desired location on the template. A "swappable" control enables or disables a user's ability to swap/switch a current content item (e.g., a team logo) in a slot to a different content item (e.g., selected from a collection of content items specified via one or more collections user interfaces). A customizable interface enables or disables a user's ability to use user provided (e.g., uploaded or entered) content (e.g., a user selfie, other image, or text) to customize a template slot.

Figure 3G:
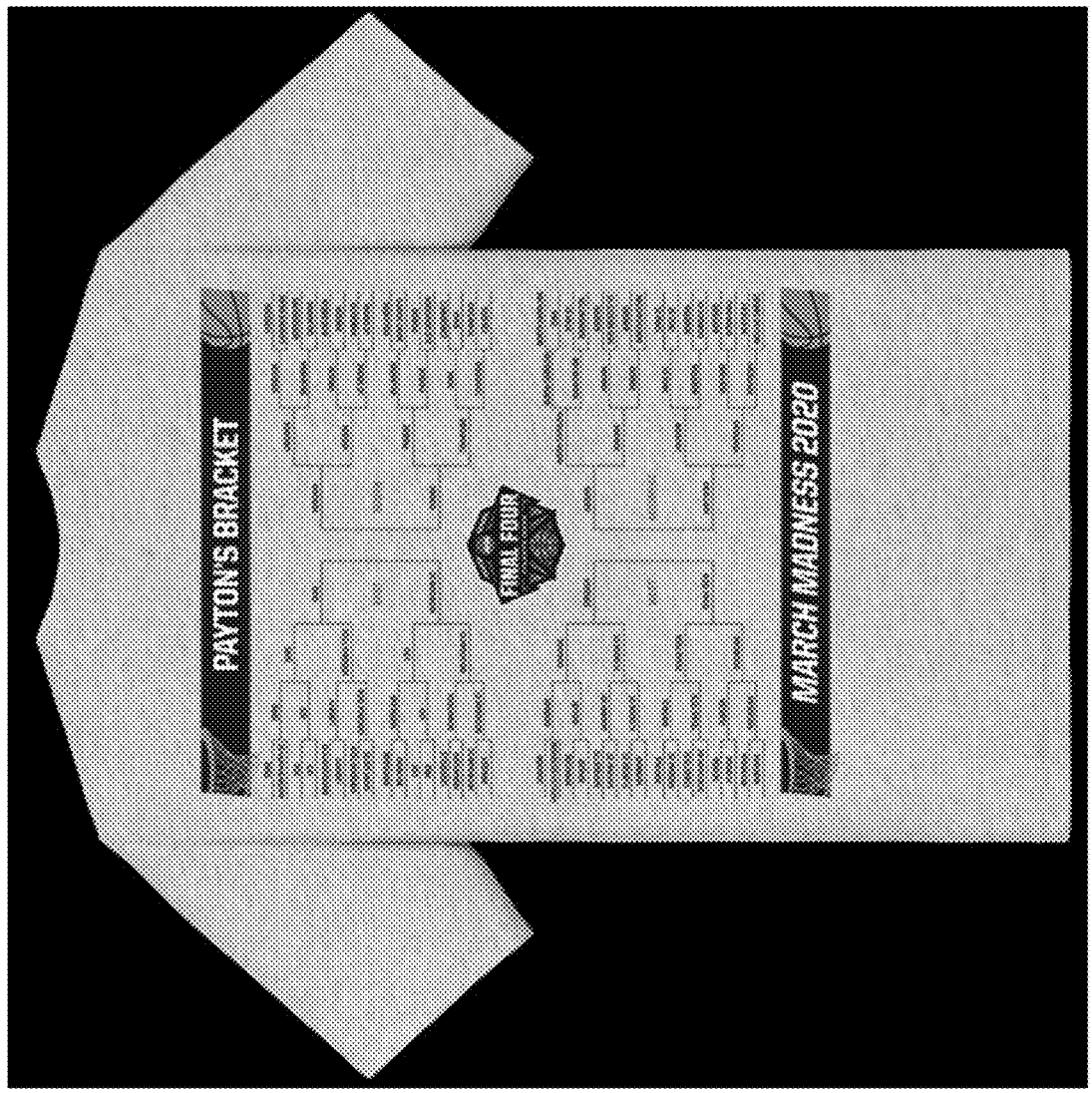

FIG. 3G illustrates an example object (a t-shirt in this example) with a user-customized template. In this example, the template includes a design element comprising a basketball hoop, net, and basketball, and user customized text (e.g., the user's name). A second design element includes a basketball hoop, net, and basketball, and a tournament name. A third design element may include a logo corresponding to a tournament stage. A fourth design element may include a tournament bracket with prepopulated team names on certain branches and user specified team names on certain other branches.

Thus, aspects of the disclosure relate to enhancement in the computer aided design and customization of physical and digital items.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integer to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. For example, a click may be in the form of a user touch (via finger or stylus) on a touch screen, or in the form of a user moving a cursor (using a mouse of keyboard navigation keys) to a displayed object and activating a physical control (e.g., a mouse button or keyboard key). User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. A computer-aided design (CAD) computer system comprising:
   a computing device;
   a network interface; and
   a non-transitory data media configured to store instructions that when executed by the computing device, cause the computing device to perform operations comprising:
     provide, to a user device of a user, the user device comprising hardware,
     a design rule definition user interface comprising:
       a conditional specification user interface comprising:
         a first field configured to receive a specification of:
           a first template slot and associated slot content for a first customizable template;
         a second field configured to receive a specification of:
           a second template slot and associated slot content specification for the first customizable template;
         an operator field configured to receive an operator specification that relates the first slot and associated slot content specification with the second slot and associated slot content specification;
       a consequent specification user interface comprising:
         a third field configured to receive a specification of:
           a third template slot and associated slot content specification for the first customizable template;
     receive, via the network interface from the user device of the user, a user selection of an image of a product from an interactive catalog;
enable the user to select, via a size selection user interface, a size for the product;
receive a size selection of a first size via the size selection user interface;
enable a representation of the product to be presented on the user device;
receive a user selection of the first customizable template, wherein the first customizable template comprises a bracket comprising multiple branches;
access one or more rules associated with the first customizable template, the accessed rules defined using the design rule definition user interface;
access a data source locator associated with the first customizable template;
access data, corresponding to a tournament including at least identifiers associated with teams participating in the tournament, using the data source locator;
determine which team identifiers are associated with which bracket branches;
enable at least a portion of the first customizable template populated using the data accessed using the data source locator to be presented by the user device via a computer aided design user interface, wherein team identifiers are positioned in association with respective bracket branches in accordance with the determination as to which team identifiers are associated with which bracket branches;
receiving a user customization of a first rendered template slot;
determining if the user customization of the first rendered template slot violates a first rule;
at least partly in response to determining that the user customization of the first rendered template slot violates the first rule, reversing the user customization of the first template slot;
receiving a user customization of a second rendered template slot;
using a second rule to modify a third rendered template slot based at least in part on the user customization of the second rendered template slot;
causing a file to be generated comprising user customization data; and
transmitting over a network the file comprising user customization data to a device separate from the CAD computer system, and causing the first customizable template, as customized by the user, to be printed or embroidered using the file comprising user customization data, by the device separate from the CAD computer system, on a physical instance of the product in the selected first size.

2. The CAD system as defined in claim 1, the operations further comprising:
inhibit the user from modifying at least a portion of the first customizable template populated using the data accessed using the data source locator.

3. The CAD system as defined in claim 1, the operations further comprising:
detect a swap permission control activation in association with at least one template slot;
receive an association of a defined collection of content items with the at least one slot; and
enable the user to swap a first content item in the at least one slot with a content item selected from the defined collection of content items.

4. The CAD system as defined in claim 1, the operations further comprising:
enable a rule to be imported via a file comprising a template slot identifier, a content item identifier, a slot action identifier, and a slot image identifier.

5. The CAD system as defined in claim 1, wherein the team identifiers positioned in association with respective bracket branches comprise graphic design elements.

6. The CAD system as defined in claim 1, wherein using the second rule to modify the third rendered template slot based at least in part on the user customization of the second rendered template slot further comprises changing a color of a content item populating the third rendered template slot.

7. The CAD system as defined in claim 1, wherein using the second rule to modify the third rendered template slot based at least in part on the user customization of the second rendered template slot further comprises populating the third rendered template slot with a content item indicated by the second rule.

8. The CAD system as defined in claim 1, wherein using the second rule to modify the third rendered template slot based at least in part on the user customization of the second rendered template slot further comprises populating the third rendered template slot based in part on real time data corresponding to a match accessed from a remote system.

9. A computer-implemented method, the method comprising:
receiving, over a network at a computer system comprising hardware, a first rule via a design rule definition user interface, the design rule definition user interface comprising:
a conditional specification user interface comprising:
a first field configured to receive a specification of:
a first template slot and associated slot content specification for a first customizable template;
a second field configured to receive a specification of:
a second template slot and associated slot content specification for the first customizable template;
an operator field configured to receive an operator specification that relates the first slot and associated slot content specification with the second slot and associated slot content specification;
a consequent specification user interface comprising:
a third field configured to receive a specification of:
a third template slot and associated slot content specification for the first customizable template;
wherein the first rule is associated with the first customizable template, the first rule comprising a first conditional specification and a first consequent specification;
receiving, over the network at the computer system from a user device of a user, a user selection of an image of an object;
enabling a representation of the object to be presented on the user device;
accessing at least the first rule associated with the first customizable template, wherein the first customizable template comprises a bracket comprising multiple branches;
accessing a data source locator associated with the first customizable template;
accessing data using the data source locator, corresponding to a tournament including at least identifiers associated with teams participating in the tournament;
determining which team identifiers are associated with which bracket branches;

enabling at least a portion of the first customizable template populated using the data accessed using the data source locator to be presented by the user device via a customization user interface, wherein team identifiers are positioned in association with respective bracket branches in accordance with the determination as to which team identifiers are associated with which bracket branches;

receiving a user input with respect to a first depicted template slot via the customization user interface;

using the first rule to modify a second depicted template slot based at least in part on the user input with respect to the first depicted template slot;

causing a file to be generated comprising user customization data;

transmitting over a network the file comprising user customization data to a device; and enabling the first customizable template, as customized by the user, to be printed or embroidered on a physical instance of the object by the device, using the file comprising user customization data.

10. The computer-implemented method as defined in claim 9, the method further comprising:
inhibiting the user from modifying at least a portion of the first customizable template populated using the data accessed using the data source locator.

11. The computer-implemented method as defined in claim 9, the method further comprising:
detecting a swap permission control activation in association with at least one template slot;
receiving an association of a defined collection of content items with the at least one slot; and
enabling the user to swap a first content item in the at least one slot with a content item selected from the defined collection of content items.

12. The computer-implemented method as defined in claim 9, the method further comprising:
enable a rule to be imported via a file comprising a template slot identifier, a content item identifier, a slot action identifier and a slot image identifier.

13. The computer-implemented method as defined in claim 9, the method further comprising enabling an electronic file corresponding to the object customized using the first customizable template to be electronically distributed.

14. The computer-implemented method as defined in claim 9, wherein using the first rule to modify the second depicted template slot based at least in part on the user input with respect to the first depicted template further comprises changing a color of a content item populating the second depicted template slot.

15. The computer-implemented method as defined in claim 9, wherein using the first rule to modify the second depicted template slot based at least in part on the user input with respect to the first depicted template slot further comprises populating the second depicted template slot with a content item indicated by the first rule.

16. The computer-implemented method as defined in claim 9 wherein using the first rule to modify the second depicted template slot based at least in part on the user input with respect to the first depicted template further comprises populating the second depicted template slot based in part on real time data corresponding to a match accessed from a remote system.

17. The computer-implemented method as defined in claim 9 wherein the operator is equal, not equal, greater than, or less than.

18. A computer system comprising:
a computing device;
a network interface; and
a non-transitory data media configured to store instructions that when executed by the computing device, cause the computing device to perform operations comprising:
receive, using the network interface, a first rule via a design rule definition user interface comprising:
a conditional specification user interface comprising:
a first field configured to receive a first template slot and associated slot content specification for a first customizable template;
a second field configured to receive a second template slot and associated slot content specification for the first customizable template;
an operator field configured to receive an operator specification that relates the first slot and associated slot content specification with the second slot and associated slot content specification;
a consequent specification user interface comprising:
a third field configured to receive a third template slot and associated slot content specification for the first customizable template;
wherein the first rule is associated with the first customizable template, the first rule comprising a first conditional specification and a first consequent specification;
receive, using the network interface from a user device of a user, a user selection of an image of an object;
enable a representation of the object to be presented on the user device;
access at least the first rule associated with the first customizable template wherein the first customizable template comprises a bracket comprising multiple branches;
access a data source locator associated with the first customizable template;
access data using the data source locator; including at least identifiers associated with respective bracket branches;
determine which identifiers are associated with which bracket branches;
enable at least a portion of the first customizable template to be populated using the data accessed using the data source locator;
enable at least a portion of the first customizable template populated using the data accessed using the data source locator to be presented by the user device via a customization user interface, wherein identifiers are positioned in association with respective bracket branches in accordance with the determination as to which identifiers are associated with which bracket branches;
enable the first rule to modify a second depicted template slot based at least in part on a user input with respect to the first depicted template slot;
cause a file to be generated comprising user customization data;
transmit the file comprising user customization data to a device; and
enable the first customizable template, as customized by the user, to be printed or embroidered on a physical instance of the object by the device, using the file comprising user customization data.

19. The system as defined in claim 18, the operations further comprising:
inhibit the user from modifying at least a portion of the first customizable template populated using the data accessed using the data source locator.

20. The system as defined in claim 18, the operations further comprising:
detect a swap permission control activation in association with at least one template slot;
receive an association of a defined collection of content items with the at least one slot;
enable the user to swap a first content item in the at least one slot with a content item selected from the defined collection of content items.

21. The system as defined in claim 18, the operations further comprising:
enable a rule to be imported via a file comprising a template slot identifier, a content item identifier, a slot action identifier and a slot image identifier.

22. The system as defined in claim 18, the operations further comprising enable an electronic file corresponding to the object customized using the first customizable template to be electronically distributed.

23. The system as defined in claim 18, wherein using the first rule to modify the second depicted template slot based at least in part on the user input with respect to the first depicted template further comprises changing a color of a content item populating the second depicted template slot.

24. The system as defined in claim 18, wherein using the first rule to modify the second depicted template slot based at least in part on the user input with respect to the first depicted template further comprises populating the second depicted template slot with a content item indicated by the second rule.

25. The system as defined in claim 18, wherein using the first rule to modify the second depicted template slot based at least in part on the user input with respect to the first depicted template further comprises populating the second depicted template slot based in part on real time data corresponding to a match accessed from a remote system.

26. A computer implemented method, the method comprising:
receiving over a network at a computer system comprising hardware a first rule via a corresponding user interface, the corresponding user interface comprising:
a conditional specification user interface comprising:
a first field configured to receive a first template slot and associated slot content specification for a first customizable template;
a second field configured to receive a second template slot and associated slot content specification for the first customizable template;
an operator field configured to receive an operator specification that relates the first slot and associated slot content specification with the second slot and associated slot content specification;
a specification user interface comprising:
a third field configured to receive a third template slot and associated slot content specification for the first customizable template;
wherein the first rule is associated with the first customizable template, the first rule comprising a first conditional specification and a first consequent specification received via the specification user interface comprising the third field;
receiving a user selection of an object;
enabling a representation of the object to be presented on the user device;
accessing at least the first rule associated with the first customizable template wherein the first customizable template comprises a bracket comprising multiple branches;
accessing a data source locator associated with the first customizable template;
accessing data using the data source locator, corresponding to a tournament including at least identifiers associated with participants in the tournament;
determining which identifiers are associated with which bracket branches;
enabling at least a portion of the first customizable template to be populated using the data accessed using the data source locator, where identifiers are positioned in association with respective bracket branches in accordance with the determination as to which identifiers are associated with which bracket branches;
enabling at least a portion of the first customizable template populated using the data accessed using the data source locator to be presented by the user device via a customization user interface;
enabling the first rule to modify a second depicted template slot based at least in part on a user input with respect to the first depicted template slot;
causing a file to be generated comprising user customization data;
transmitting file comprising user customization data to a device; and
enabling, using the file, the first customizable template, as customized by the user, to be printed or embroidered on a physical instance of the object and/or for an electronic file corresponding to the object customized using the first customizable template to be electronically distributed.

27. The computer implemented method as defined in claim 26, the method further comprising:
inhibiting the user from modifying at least a portion of the first customizable template populated using the data accessed using the data source locator.

28. The computer implemented method as defined in claim 26, wherein-identifiers positioned in association with respective bracket branches comprise graphic design elements.

29. The computer implemented method as defined in claim 26, wherein using the first rule to modify the second depicted template slot based at least in part on the user input with respect to the first depicted template further comprises changing a color of a content item populating the second depicted template slot.

30. The computer implemented method as defined in claim 26, wherein using the first rule to modify the second depicted template slot based at least in part on the user input with respect to the first depicted template further comprises populating the second depicted template slot based in part on real time data corresponding to a match accessed from a remote system.

* * * * *

UNITED STATES PATENT AND TRADEMARK OFFICE
CERTIFICATE OF CORRECTION

PATENT NO. : 11,263,371 B2
APPLICATION NO. : 17/185284
DATED : March 1, 2022
INVENTOR(S) : Michael Bowen et al.

It is certified that error appears in the above-identified patent and that said Letters Patent is hereby corrected as shown below:

On the Title Page

Column 1, ((73) Assignee), Line 1: Delete "Miami Beach (CA)" and insert -- Miami Beach, FL (US) --.

Column 2, ((57) Abstract), Line 12: Delete "one or" and insert -- one or more --.

On Page 2, Column 2, ((56) Other Publications), Line 3: Delete "B0fMCPNG43Sv4I4oc0MyUf?" and insert -- B0fMCPNG43Sv4l4oc0MyUf? --.

On Page 2, Column 2, ((56) Other Publications), Line 6: Delete "lcEX2isIP08." and insert -- IcEX2islP08. --.

In the Drawings

On Sheet 3 of 11, and on the title page, the print figure, (Reference Numeral 224), (FIG. 2A), Line 1: Delete "PROPOGATE?" and insert -- PROPAGATE? --.

On Sheet 4 of 11, (Reference Numeral 232), (FIG. 2B), Line 1: Delete "PROPOGATE?" and insert -- PROPAGATE? --.

In the Specification

On Column 12, Lines 9-10 (approx.): Delete "greater then, less then," and insert -- greater than, less than, --.

On Column 15, Line 29: Delete "may be automatically be" and insert -- may automatically be --.

On Column 16, Line 6: Delete "greater then, less then," and insert -- greater than, less than, --.

Signed and Sealed this
Seventeenth Day of May, 2022

Katherine Kelly Vidal
*Director of the United States Patent and Trademark Office*

On Column 16, Line 34: Delete "and or" and insert -- and/or --.

On Column 16, Line 67: Delete "announced" and insert -- announced; --.

In the Claims

On Column 25, Line 44: In Claim 26, delete "hardware" and insert -- hardware, --.

On Column 26, Line 46 (approx.): In Claim 28, delete "wherein-identifiers" and insert -- wherein identifiers --.